US 6,739,566 B1

(12) United States Patent
Kao

(10) Patent No.: US 6,739,566 B1
(45) Date of Patent: *May 25, 2004

(54) REVOLVING SUPPORT STAND WITH DUAL POWER OUTLETS

(75) Inventor: Cheung Chong Kao, Chai Wan (HK)

(73) Assignee: Boto (Licenses) Limited, Douglas (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/408,850

(22) Filed: Apr. 8, 2003

(51) Int. Cl.[7] .............................................. F16M 13/00
(52) U.S. Cl. ..................................... 248/522; 248/519
(58) Field of Search ................................ 248/522, 524, 248/519, 521, 527, 528, 349.1, 523, 525, 131, 427; 40/457; 211/1.51, 163

(56) References Cited

U.S. PATENT DOCUMENTS

| 2,674,147 A | | 4/1954 | Franklin |
| 3,017,150 A | * | 1/1962 | Kahle ................... 248/522 |
| 3,042,350 A | | 7/1962 | Lencioni |
| 4,061,306 A | * | 12/1977 | Taylor .................. 248/523 |
| 4,895,339 A | | 1/1990 | Yang et al. |
| 5,255,886 A | | 10/1993 | Wang |
| 5,647,569 A | * | 7/1997 | Sofy ..................... 248/522 |
| 5,713,554 A | | 2/1998 | Lai |
| 5,878,989 A | * | 3/1999 | Allman ................. 248/522 |
| 5,921,022 A | | 7/1999 | Baker |
| 6,320,327 B1 | | 11/2001 | Lavatelli et al. |
| 6,536,721 B1 | * | 3/2003 | Kao ..................... 248/131 |

FOREIGN PATENT DOCUMENTS

GB  2272369 A  5/1994

* cited by examiner

Primary Examiner—Leslie A. Braun
Assistant Examiner—Tan Le
(74) Attorney, Agent, or Firm—G Brian Pingel; Camille L. Urban

(57) ABSTRACT

A revolving support stand for an ornamental display including a base having a housing and a trunk holder that is seated in the top opening of the base and includes a pair of electrical outlets. An electrical motor is located in one side of the base and provides a drive for gear teeth located on the trunk holder to rotate the trunk holder with respect to the base. A bearing race is centrally positioned in the base so that a bottom portion of the trunk holder is seated on the race, which serves as a truss bearing to overcome axial loads applied on the housing by the ornamental display supported by the stand.

16 Claims, 6 Drawing Sheets

REVOLVING SUPPORT STAND WITH DUAL POWER OUTLETS

BACKGROUND OF THE INVENTION

1. Field of the Invention

The present invention relates to support stands that are designed to serve as a support for a decorative display such as a Christmas tree, and more specifically relates to a support stand that causes the decorative display to rotate in a circular fashion and has an electrical source of supply for the display.

2. Description of the Prior Art

Support stands for decorative displays such as Christmas trees have long been known and a variety of different embodiments for such stands are available. With respect to stands used to support decorative displays, such as Christmas trees, that include electrical lighting, the use of a stand that causes the display to rotate provides the problem of supplying electrical power to the lighting in a fashion that does not cause electrical cords to become wrapped around the display during its rotation.

A number of prior art devices have been developed to provide rotation for Christmas trees or other types of decorative displays requiring electrical power. For example, U.S. Pat. No. 5,255,886 issued to Wang and U.S. Pat. No. 5,647,569 issued to Sofy both illustrate rotating stand assemblies that include rotatable platforms for supporting the trunk of a decorative display. Other types of support stands for decorative displays are disclosed in U.S. Pat. Nos. 6,320,327 B1 and 5,713,554, as well as U.K Patent Appln. No. 9224079.5 published May 18, 1994. Although the foregoing prior art devices provide rotating supports for decorative displays, they do not appear to be designed to handle larger types of displays that are not only tall, but also are heavy, which affects the stability and rotation provided by the stand.

SUMMARY OF THE INVENTION

The present invention provides an improved revolving stand to support the trunk of a decorative display for circular rotation and includes a base, a trunk holder associated with the base, an electrical motor and associated gears for rotating the trunk holder, a pair of electrical outlets associated with an upper end of the trunk holder, and means for supplying electrical power from a power source to the electrical outlets while the trunk holder rotates with respect to the base.

Preferably, the trunk holder includes a bottom hub portion that extends through a top opening in the base to seat upon a bearing race located in the base. Electrical contact means are located in the base and the hub of the trunk holder includes conducting means for electrically connecting the dual electrical outlets to the contact means. Gear means are associated with the motor and the trunk holder to provide rotational force on the holder when the motor is in an on condition, and conducting means are provided for supplying electrical power to the motor and the contact means from a source of power, such as a normal electrical outlet of a building.

Preferably, the electrical conducting means include electrical contacts mounted on the bottom of the hub portion of the trunk holder so that each of the contacts engage one of the contact means in the base, and further includes electrical conductors extending between the dual electrical outlets and the hub electrical contacts so that as the trunk holder rotates, a complete electrical circuit is maintained from the power source for providing electrical power to the outlets at the top of the trunk holder.

The foregoing and other advantages of the present invention will appear from the following description. In the description, reference is made to the accompanying drawings, which form a part hereof, and in which there is shown by illustration and not of limitation a specific form in which the invention may be embodied. Such embodiment does not represent the full scope of the invention, but rather the invention may be employed in a variety of other embodiments and reference is made to the claims herein for interpreting the breadth of the invention.

DETAILED DESCRIPTION OF THE PREFERRED EMBODIMENT

Figure 1:
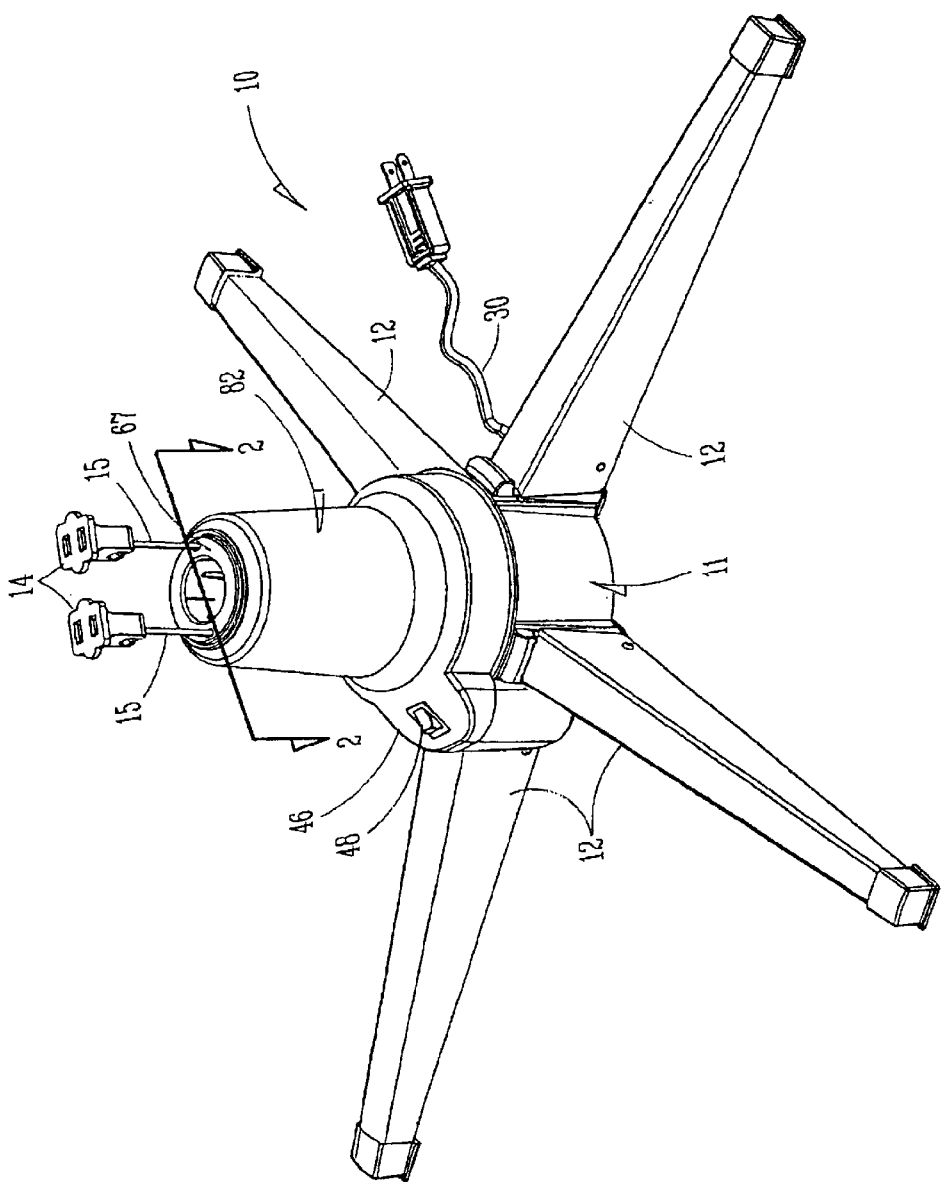
FIG. 1 is a front perspective view of a preferred embodiment of a revolving support stand in accordance with the present invention.

Referring now to the drawings and with reference first to FIG. 1, a preferred embodiment of the revolving support stand with dual power outlets of the present invention is shown generally at 10 and is adapted preferably for supporting the trunk of a decorative display such as a Christmas tree. The stand 10 includes a support base 11 that preferably includes four outwardly extending legs 12 spaced apart by ninety degrees and being removable from the remainder of the base 11. Supported by the base 11 is a trunk holder 13 that includes a pair of electrical outlets 14 at its upper end connected to electrically conductive cords 15.

Figure 2:
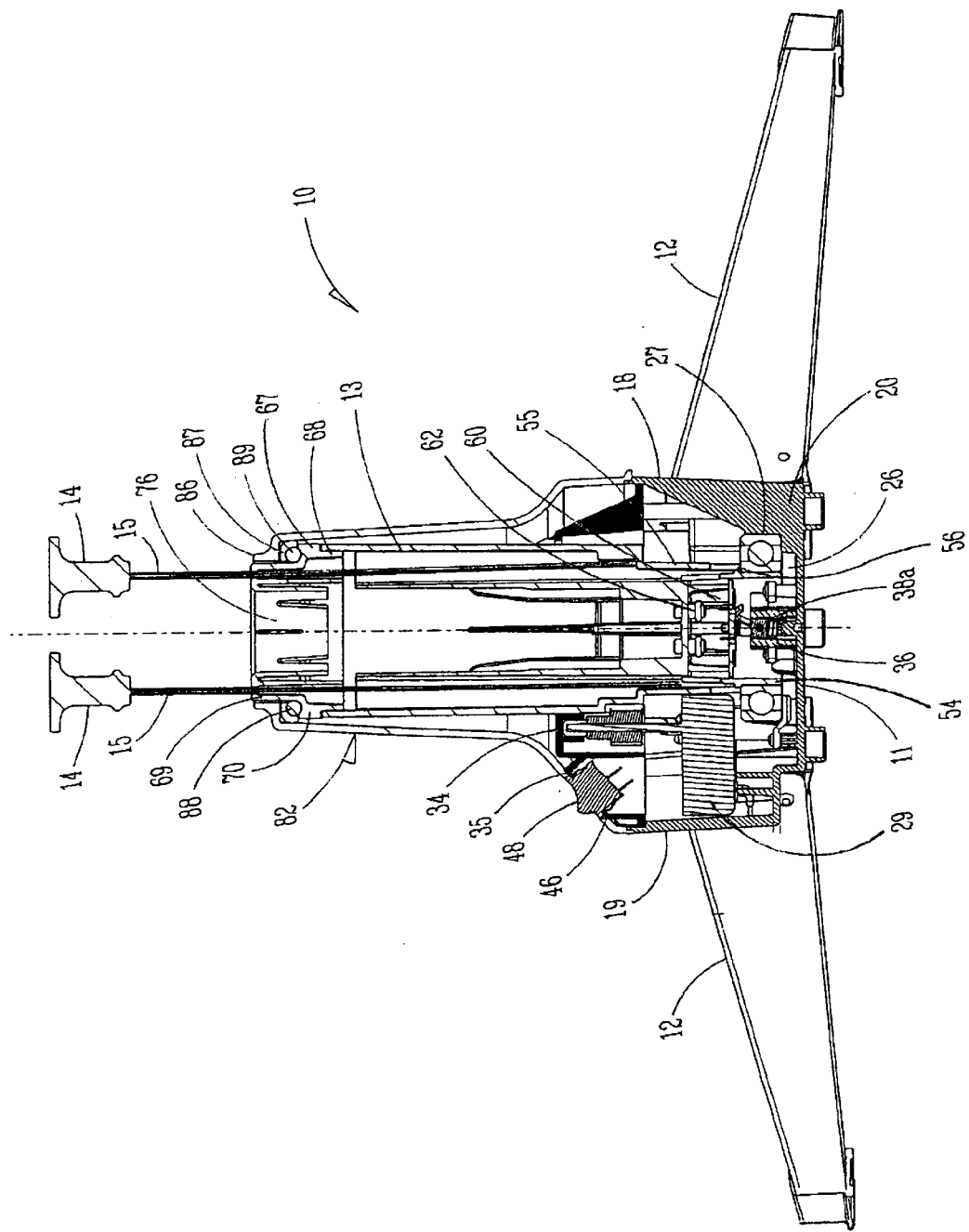
FIG. 2 is a cross-sectional view taken along the line 2—2 of FIG. 1.
Figure 5:
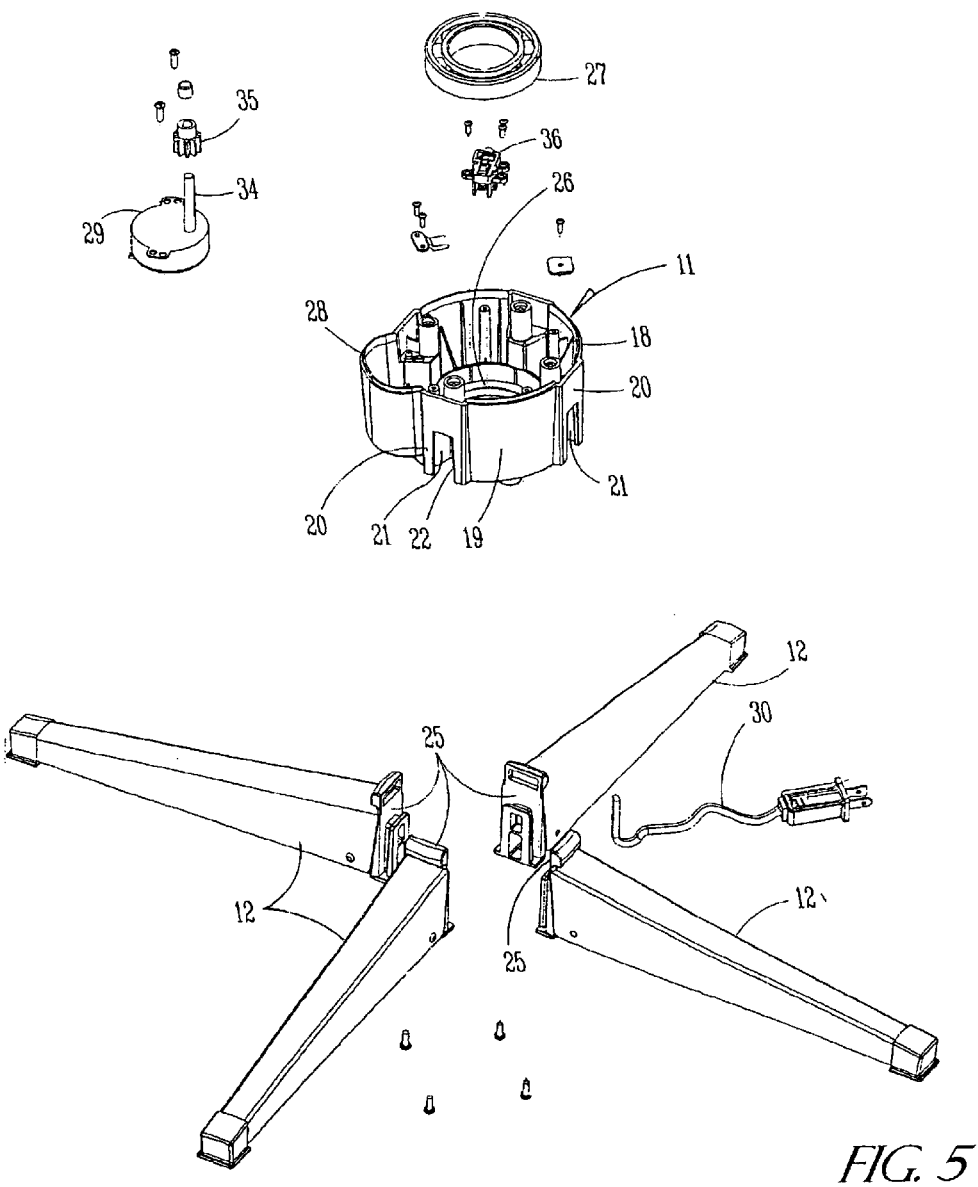
FIG. 5 is an exploded perspective view of a bottom portion of the embodiment of FIG. 1 showing a base together with supporting legs.

Referring now to FIGS. 2 and 5, the base 11 is shown as including a housing 18 with a sidewall 19 having four equally spaced apart shoulder type projections 20. Each of the projections 20 includes a channel 21 with an open bottom end 22. A connecting post 25 is located on the inner end of each of the legs 12 and conforms in shape to that of one of the channels 21 so that the leg posts 25 are insertable into the channels 21 for removably attaching the legs 12 to the base 11.

The interior of the base housing 18 includes a ledge 26 that serves as a seat for a bearing race 27 in which a plurality of steel balls sit to serve as trust bearing to overcome the axial load applied on the housing 18 by the ornamental display supported by the stand 10. The housing sidewall 19 has a pocket portion 28 to provide room for an electrical motor 29 that is attached to a power cord 30 that can be plugged into a source of electrical power for the light display. The motor 29 includes a drive shaft 34 on which a drive pinion gear 35 is mounted for a purpose as will be described below.

Figure 6:
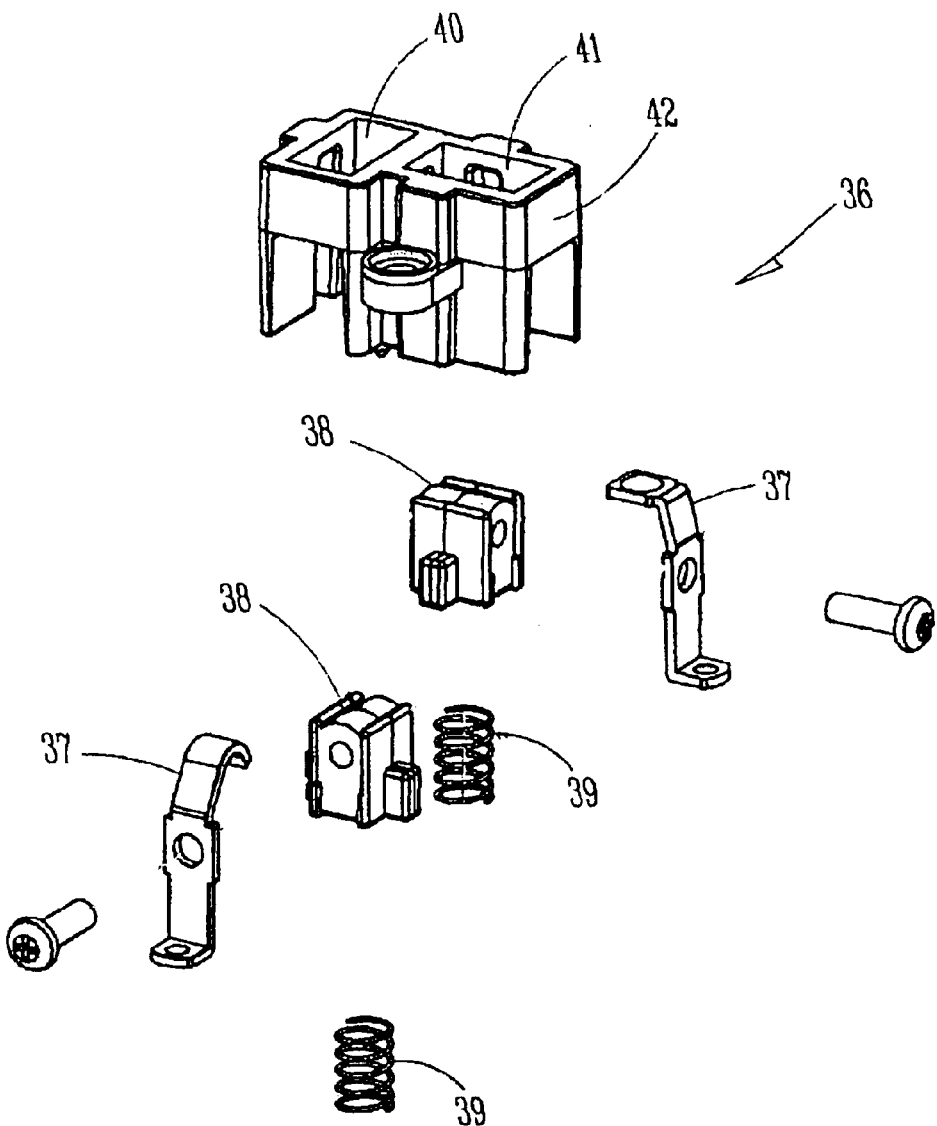
FIG. 6 is an exploded perspective view of an electrical contact assembly that is located in the base of the FIG. 5.

Mounted on the floor of the base 11 to be located within the open center of the bearing race 27 is an electrical contact assembly 36, which is best shown in an enlarged view in FIG. 6. The contact assembly 36 is also in electrical communication with the power cord 30 and includes a pair of electrical contacts 37 that are mounted on contact blocks 38 as by screws. The contact blocks 38 have recesses 38a that serve as receptacles for springs 39. Thus, when the blocks 38 are positioned in channels 40 and 41 of a contact block frame 42 for the assembly 36, the contacts 37 are placed in a spring biased condition to be urged upwardly from the floor of the base 11.

Figure 3:
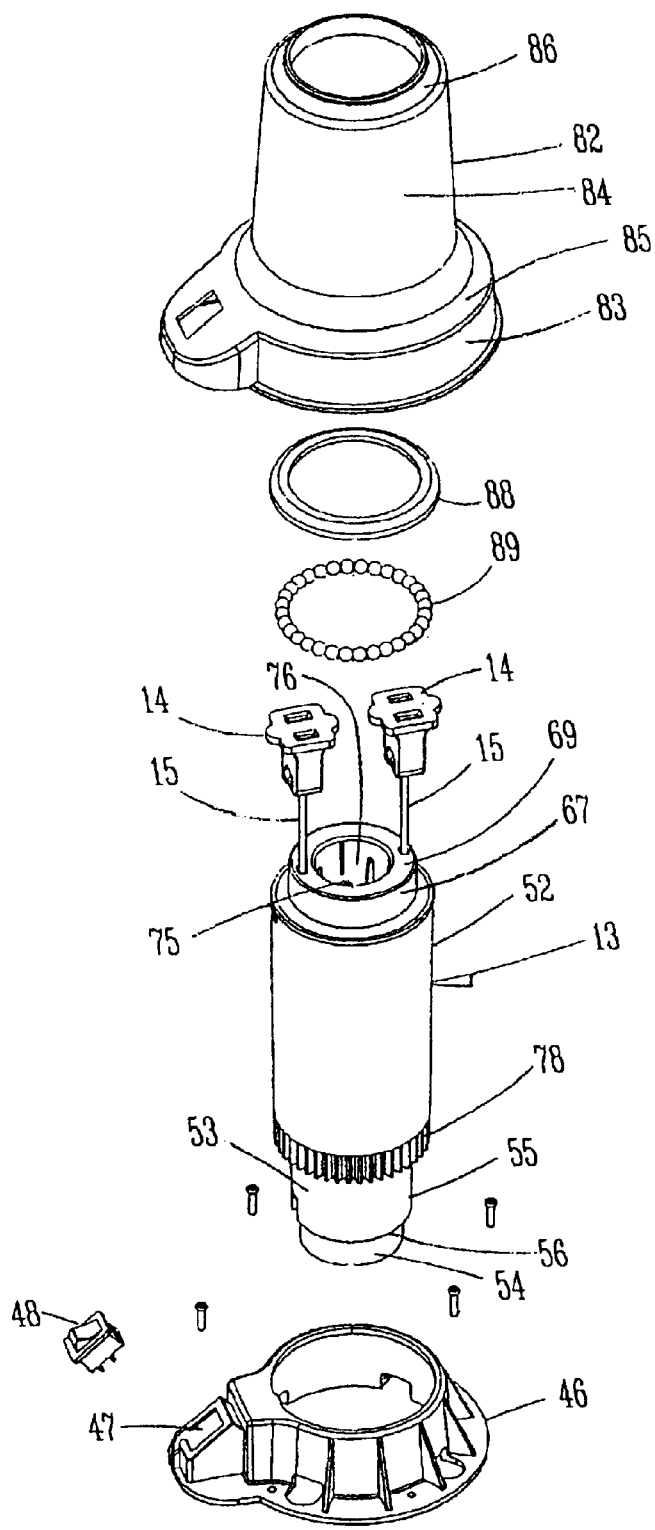
FIG. 3 is a partially exploded perspective view of an upper portion of the embodiment of FIG. 1.

Referring now to both FIGS. 2 and 3, the base 11 is partially closed off by and attached to a base cover 46 that includes a side opening 47 through which a single pull, single throw electrical switch 48 is mounted in the cover 46, which switch 48 acts to turn the stand 10 on and off. Extending downwardly through the cover 46 is the trunk holder 13 that includes a body 52 that is generally cylindrically shaped with a lower hub portion 53.

The hub 53 is formed in a stair stepped configuration to provide an end portion 54 that is reduced in size with respect to a top portion 55 to provide a ledge 56 therebetween. Consequently, when the trunk holder 13 is positioned in the base 11, the ledge 56 seats upon and is supported by the bearing race 27. In such position, the bottom of the trunk holder end 54 is adjacent the contact assembly 36.

Figure 4:
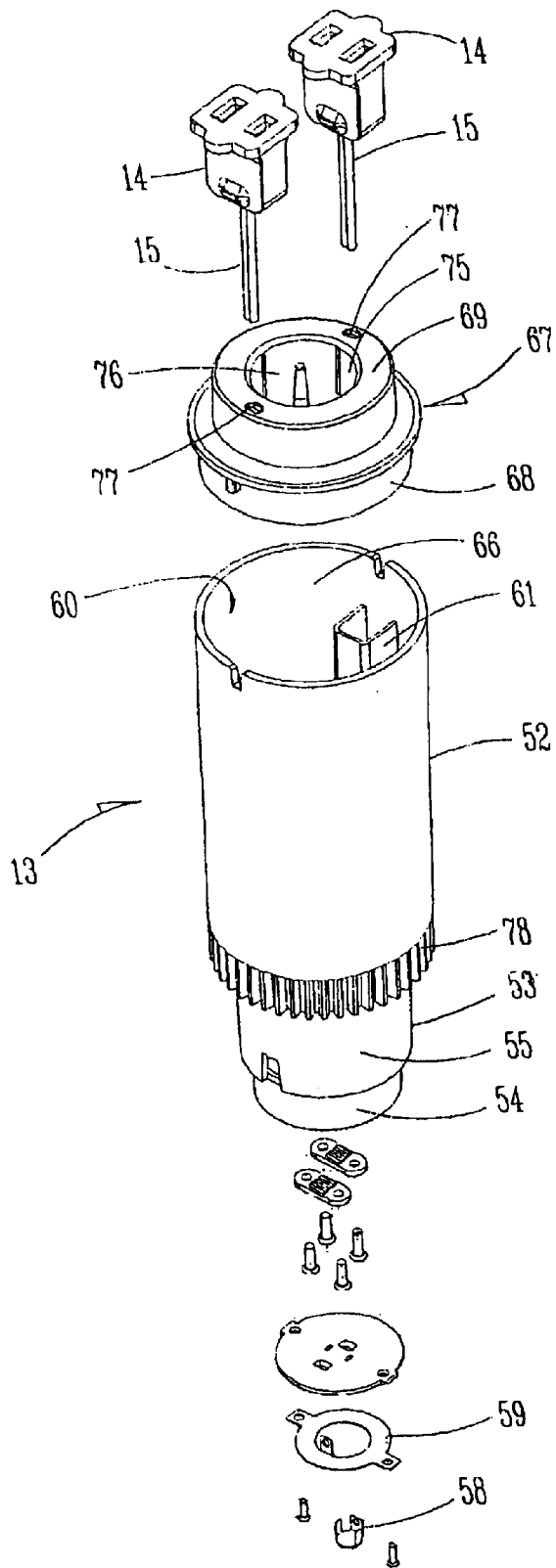
FIG. 4 is an exploded perspective view of a trunk holder that forms a portion of the embodiment of FIG. 1.

As indicated in FIG. 4, electrically conducting contacts in the form of a central stud 58 and a ring 59 are secured on the hub bottom end 57 to bear against and provide an electrical connection with the spring biased contacts 37 so as to provide a continuing electrical contact between the stationary contacts 37 and the trunk holder 13 as it rotates with respect to the base 11.

The trunk holder 13 has a hollow interior 60 and preferably, two elongated electrical cord guideways 61 are attached to the interior 60. Each of the guideways 61 receive one of the cords 15 as it extends from the respective plug 14 to the base of the hub 53. An electrical connection is made between the ends of each cord 15 and the conductive stud 58 and ring 59 by means of wires 60 and electrical contacts 62 located in the trunk holder 13, see FIG. 2.

The trunk holder 13 has an open top 66 for receiving a collar cover 67. The cover 67 has a bottom end 68 sized to be snuggly received in the trunk holder open end 66, a top end 69 and a flange 70 that separates the two ends, all being of an annular configuration. Thus, the bottom end 68 of cover 67 is receivable within the interior 60 so that the flange 70 sits upon the top end of the holder body 52.

The collar cover 67 has a central opening 75 that is lined with resilient fingers 76 to provide a guideway for the trunk of a display to be held by the trunk holder 13 and secure the trunk therein. Apertures 77 are formed in opposite sides of the top of the collar 67 to provide ports through which the electrical cords 15 can extend.

The bottom of the trunk holder body 52 is formed with gear teeth 78 for engaging the pinion gear 35 so that as the motor 29 is operated, the trunk holder 13 is rotatably driven with respect to the base 11. Because the circumference of the gear teeth 78 is relatively large, the rotational speed of trunk holder 13 is low.

Referring again to FIGS. 2 and 3, to stabilize the trunk holder 13 with respect to the base 11, a top cover 82 is adapted to fit over the trunk holder 13 and connect with the base cover 46 as by screws. The cover 82 is generally circularly shaped at its bottom end 83 and has an upper portion 84 that is generally frustoconically shaped to provide an abutment 85 therebetween that rests on the top of the base cover 46.

The upper portion 84 of the top cover 82 has a top end 86 that is reduced in size, as best indicated in FIG. 2, to provide a ledge portion 87 that rests upon a bearing race 88 for holding a plurality of steel balls 89 in position. The race 88 and balls 89 serve as a bearing between the trunk holder 13 and the top cover 82, which bearing acts to overcome radial loads and to provide a bearing engagement between the top cover 82 and the trunk holder 13 when there is rotational motion of the holder 13 relative to the cover 82.

Thus, the present invention provides a durable and efficient support for displaying a decorative display in a rotational fashion that permits the use of electrical lights on the display and provides a pair of outlets for supplying electrical power to such lights. The foregoing description of the present invention is solely for illustrative purposes only. It is to be understood that the terminology that has been used herein is intended to be in the nature of words of description rather than of limitation. Many modifications and variations of the present invention are possible in light of the above teachings. For example, there are many different alternatives for providing the electrical circuitry necessary for the present invention and the particular circuitry disclosed would be known by those skilled in the art as being only one example of the type of circuitry that could be utilized in the present invention. Therefore, the foregoing description is not to be taken as definitive of the scope of the invention; but rather that which is regarded as the invention is set forth in following claims.

What is claimed is:

1. A revolving stand to support the trunk of a decorative display for circular rotation, said stand comprising:
   (a) a generally hollow base having a lower central portion that forms a bearing seat and a top that has an opening;
   (b) bearing means seated in said base;
   (c) a vertically aligned trunk holder with a bottom hub portion engaging and supported by said bearing means and an upper tubular shaped portion for receiving the trunk of said display;
   (d) an electrical motor located in said base;
   (e) gear means associated with said motor and said trunk holder in such fashion that when said motor is actuated said trunk holder is rotated with respect to said base;
   (f) at least two electrical power outlets associated with the upper end of said trunk holder;
   (g) a power cord associated with said base;
   (h) electrical conducting means associated with said base and said trunk holder for conducting electrical power from said cord to said outlets;
   (i) said electrical conducting means includes a conductive central stud and a conductive ring on said bottom hub portion that provide an electrical connection with a plurality of spring biased contacts associated with said base; and
   (j) a trunk holder cover that has an opening that communicates with the trunk receiving portion of said trunk holder and is semi-permanently attached to said base for maintaining said trunk holding in a vertically aligned position.

2. A revolving stand as recited in claim 1, wherein said stand further includes a collar cover associated with the top end of said trunk holder and having a central opening that is lined with resilient fingers for engaging the trunk of said decorative display.

3. A revolving stand as recited in claim 2, wherein said collar cover further includes a seat for bearing means that is interposed between said collar cover and said top cover.

4. A revolving stand as recited in claim 1, wherein said trunk holder has a cylindrically shaped hollow body portion and a lower hub portion and gear teeth are formed on the exterior of said body portion.

5. A revolving stand as recited in claim 1, wherein said base includes a plurality of legs.

6. A revolving stand as recited in claim 5, wherein said legs are removable from said base.

7. A revolving stand as recited in claim 1, wherein said base includes a switch for actuating said motor to rotatably drive said trunk holder with respect to said base.

8. A revolving stand as recited in claim 1, wherein said electrical conducting means includes a conductive cord for each of said power outlets and guideways for said cords are located within said trunk holder.

9. A revolving stand to support the trunk of a decorative display for circular rotation, said stand comprising:
(a) a generally hollow base having a lower central portion that forms a bearing seat and a top that has an opening;
(b) bearing means seated in said base;
(c) a vertically aligned trunk holder with a bottom hub portion engaging and supported by said bearing means and an upper tubular shaped portion for receiving the trunk of said display;
(d) an electrical motor located in said base;
(e) gear means associated with said motor and said trunk holder in such fashion that when said motor is actuated said trunk holder is rotated with respect to said base;
(f) at least two electrical power outlets associated with the upper end of said trunk holder;
(g) a power cord associated with said base;
(h) electrical conducting means associated with said base and said trunk holder for conducting electrical power from said cord to said outlets;
(i) a trunk holder cover that has an opening that communicates with the trunk receiving portion of said trunk holder and is semi-permanently attached to said base for maintaining said trunk holding in a vertically aligned position; and
(j) a collar cover associated with the top end of said trunk holder and having a central opening that is lined with resilient fingers for engaging the trunk of said decorative display.

10. A revolving stand as recited in claim 9, wherein said collar cover further includes a seat for bearing means that is interposed between said collar cover and said top cover.

11. A revolving stand as recited in claim 9, wherein said base includes a switch for actuating said motor to rotatably drive said trunk holder with respect to said base.

12. A revolving stand as recited in claim 9, wherein said trunk holder hub portion has electrical contact means and said base has a contact assembly for engaging the contact means on said trunk holder.

13. A revolving stand as recited in claim 9, wherein said electrical conducting means includes spring biased electrical contacts associated with said base.

14. A revolving stand to support the trunk of a decorative display for circular rotation, said stand comprising:
(a) a generally hollow base having a lower central portion that forms a bearing seat and a top that has an opening;
(b) bearing means seated in said base;
(c) a vertically aligned trunk holder with a bottom hub portion engaging and supported by said bearing means and an upper tubular shaped portion for receiving the trunk of said display;
(d) an electrical motor located in said base;
(e) gear means associated with said motor and said trunk holder in such fashion that when said motor is actuated said trunk holder is rotated with respect to said base;
(f) at least two electrical power outlets associated with the upper end of said trunk holder;
(g) a power cord associated with said base;
(h) electrical conducting means associated with said base and said trunk holder for conducting electrical power from said cord to said outlets;
(i) a trunk holder cover that has an opening that communicates with the trunk receiving portion of said trunk holder and is semi-permanently attached to said base for maintaining said trunk holding in a vertically aligned position; and
(j) said base includes a switch for actuating said motor to rotatably drive said trunk holder with respect to said base.

15. A revolving stand as recited in claim 14, wherein said trunk holder hub portion has electrical contact means and said base has a contact assembly for engaging the contact means on said trunk holder.

16. A revolving stand as recited in claim 14, wherein said electrical conducting means includes spring biased electrical contacts associated with said base.

* * * * *

UNITED STATES PATENT AND TRADEMARK OFFICE
CERTIFICATE OF CORRECTION

PATENT NO. : 6,739,566 B1  Page 1 of 1
APPLICATION NO. : 10/408850
DATED : May 25, 2004
INVENTOR(S) : Cheung Chong Kao It is certified that error appears in the above-identified patent and that said Letters Patent is hereby corrected as shown below:

In claim 1, column 4, ln. 58, please delete the word "holding" and substitute --holder--.

Signed and Sealed this

Twenty-ninth Day of January, 2008

JON W. DUDAS
*Director of the United States Patent and Trademark Office*